United States Patent
Guyer et al.

(10) Patent No.: US 7,312,429 B2
(45) Date of Patent: Dec. 25, 2007

(54) METHOD AND APPARATUS OF USING OPTICAL DISTORTION IN A DIRECTED COUNTERMEASURE SYSTEM TO PROVIDE A VARIABLE FIELD OF VIEW

(75) Inventors: Robert C. Guyer, Beverly, MA (US); Anthony Kirkham, St. Asaph (GB)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 20 days.

(21) Appl. No.: 10/530,599

(22) PCT Filed: Oct. 17, 2003

(86) PCT No.: PCT/US03/33288

§ 371 (c)(1),
(2), (4) Date: Apr. 7, 2005

(87) PCT Pub. No.: WO2004/036269

PCT Pub. Date: Apr. 29, 2004

(65) Prior Publication Data

US 2006/0163446 A1 Jul. 27, 2006

(51) Int. Cl.
*G01C 21/02* (2006.01)
*G01C 21/24* (2006.01)
*G01J 1/20* (2006.01)

(52) U.S. Cl. .............................. 250/203.6; 250/203.1; 250/342

(58) Field of Classification Search ............. 250/203.1, 250/203.2, 203.3, 203.6, 339.14, 339.15, 250/342; 356/139.04; 473/140–166, 176, 473/192, 199
See application file for complete search history.

(56) References Cited

U.S. PATENT DOCUMENTS

| 5,770,850 A | * | 6/1998 | Bowen et al. ............. 250/203.1 |
| 5,903,005 A | * | 5/1999 | Smith .......................... 250/334 |
| 6,414,343 B1 | * | 7/2002 | Kondo et al. ................ 257/294 |

OTHER PUBLICATIONS

Sean McHugh, "Understanding Camera Lenses", at http://www.cambridgeincolour.com/tutorials/camera-lenses.htm.*

* cited by examiner

*Primary Examiner*—Georgia Epps
*Assistant Examiner*—Patrick J. Lee
(74) *Attorney, Agent, or Firm*—Robert K. Tendler; Daniel J. Long

(57) ABSTRACT

A single, hard-mounted set of optics is utilized to replace a two field-of-view system for directed countermeasures. It includes within one continuous but distorted field of view the capability to detect, acquire and characterize targets at the edge of the field while precisely tracking with high target fidelity at the field center. With multiple targets, both tracking of a primary target and acquisition of a secondary target can occur simultaneously, greatly improving countermeasure effectiveness.

18 Claims, 7 Drawing Sheets

Field switching Optics System

FOVEAL Optical System

METHOD AND APPARATUS OF USING OPTICAL DISTORTION IN A DIRECTED COUNTERMEASURE SYSTEM TO PROVIDE A VARIABLE FIELD OF VIEW

FIELD OF THE INVENTION

This invention relates to optical countermeasure systems and more particularly to the use of fixed optics and optical distortion to provide a wide field of view during a search mode and a narrowed field of view during a tracking mode.

BACKGROUND OF THE INVENTION

In directed countermeasure systems, an incoming missile is detected by an IR focal plane array in a target acquisition mode and when detected is tracked in a tracking mode. In the target acquisition mode, it is important that the optics utilized in detecting the launch of, for instance, a shoulder-fired missile, have a relatively wide field of view so that incoming missiles will not escape the countermeasure system by being outside its field of view. For such a target acquisition, the lens assembly utilized has oftentimes been likened to a fisheye lens which in essence covers a wide field of view and is therefore capable of detecting targets over a wide area.

Early countermeasure systems included a simple fixed field of view optical system in order to acquire incoming missiles which were either shoulder launched or launched from vehicles. As will be appreciated, these early countermeasure systems worked to determine whether or not a missile had been fired against an aircraft, or other target. The aircraft was provided with sensors to detect the plume of the exhaust gases from the missile to warn those in the aircraft that a missile had been launched at the aircraft.

Early on, various systems were utilized to separate false targets from a real target and then to direct a jam head to slew over to the position of the detected target, whereupon jamming radiation was emitted from the jam head.

The problem with the fixed field of view was that in order to be able to find a threat one needed a wild field of view; but in order to track the threat one needed a relatively small field of view. If one were limited to a narrow field of view for the resolution necessary for tracking, the system might not find incoming missiles off-axis by more than a couple of degrees. The result is that one had to scan the narrow field-of-view optics to be able to detect an incoming threat. This search mode, however, was time consuming, leading to the present two field-of-view system described below.

Moreover, once the target had been detected, one had to position the jam head to put the detected target directly at the center of the optics of the jam head and then perform very precision tracking in order to be able to accurately detect the position in space of the incoming missile so that countermeasure radiation could be projected directly into the seeker or reticle of the incoming missile.

The problem with fixed field-of-view optics had been the tradeoff between the field of view being too small to acquire a target versus being too large to be able to accurately determine its position in space.

In order to solve the problem of field of view for the acquisition and tracking phases, in the past a technique was developed which involved a two field-of-view system.

The two field-of-view system was selected over a zoomed telephoto lens both because of the size of the telephoto lens and alignment problems when zooming. It will be appreciated that in the gimbaled head of the tracker, telephoto zoom-type optics require too much space, especially, for instance, for a telephoto lens to go from a wide field of view to a narrow field of view, sometimes involving a 5:1 ratio.

In short, it was impractical to provide a pod of sufficient dimensions to house such a telephoto lens and for this reason, current two field-of-view systems are now prevalent.

In these systems one has a fixed objective lens system which provides for the telephoto magnification utilized in the tracking phase in which the viewing angle is on the order of one to two degrees. In the search mode, a movable assembly is rotated onto the optical center line of the fixed objective lens. The purpose of interposing the assembly between the objective lens and the IR focal plane detector is to provide a combined focal length which is quite short, resulting in a wide field of view suitable for the search or acquisition mode. In one embodiment, during the search or acquisition phase, the effective focal length of the system was short to provide a wide field of view. In the tracking phase, the assembly was rotated out of the way of the objective lens system to increase the focal length for increasing magnification to assist tracking. In so doing, the effective focal length is several times greater. The result is magnification and better resolution, but at the cost of a narrow field of view unsuitable for searching.

In operation, the moveable assembly was rotated onto the center line of the fixed objective lens. The entire optical system was then driven by gimbals to center a target in the field of view. When centered in the field of view, the movable assembly was rotated away from the optical center line of the objective lens to switch to a higher magnification, with the higher magnification achieving sub-milliradian tracking accuracies.

Such a two field-of-view system was more than adequate to acquire the incoming missile targets in a search or acquisition phase and to later track the acquired targets to a high precision in the tracking phase.

The problem with such two-field-of-view systems is that the switching from the search phase to the tracking phase and back again takes a relatively long period of time, long relative to the time of flight of the attacking missile. Switching delays could regularly exceed a second. It will be noted that, for a shoulder-fired missile, oftentimes there is only a period of less than three seconds in which to identify that a missile has been fired, to locate it, to center the missile on the optical axis of the countermeasure detection system, to track the incoming missile with a high degree of precision and then to jam it with radiation projected out along the tracker's optical axis.

Not only were solenoids or motors used to drive the movable assembly into and out of position along the optical axis of the objective lens, alignment problems could occur during this electromechanical actuation process. Thus, for instance, if the optics were to initially aligned to within tight tolerances, oftentimes the movable assembly threw the entire system out of alignment.

More importantly, should the solenoid or mechanical actuation system fail at any time within the critical engagement period, one could not track the threat and the countermeasure system could fail to countermeasure the incoming missile.

There was therefore a requirement for providing a multiple focal length or multiple field-of-view system without moving parts. It was thought that making the multiple field-of-view system a fixed optical system would eliminate the delays associated with switching. It would also eliminate alignment errors as well as the effects of mechanical malfunction so as to provide a robust search and tracking system within an exceptionally small package.

In short, there was a requirement to have a fixed optical system to provide a wide field of view for acquisition and a narrow field of view for tracking.

Moreover, missiles are usually fired in pairs and the jammer must deal with them one at a time. One therefore needs a system that has a wide, continuous field of view so that it can both track and jam one missile and identify/characterize a second missile for subsequent jamming. This cannot be done with field switching systems that either acquire or track but do not do both simultaneously.

SUMMARY OF INVENTION

In order to provide varying fields of view for acquisition and tracking modes, in the subject invention, a fixed optical system is provided with optics that result in intentional optical distortion. The distortion is introduced to vary the system focal length and thus the field of view as a function of how far off-axis the target or object is. The intentional distortion provides a short focal length at the field extremes and gradually transitions to a longer focal length with improving resolution and magnification as the object approaches the field center, i.e., along the centerline of the optical system. In one embodiment, the field of view for the search mode is 30°, whereas in the tracking mode the field of view is 10% of that, or 3°.

Since there is no rotation of an optical cage or assembly into and out of the optical path, one eliminates the delay associated with movement of the assembly. There is no time lag between the search and tracking modes and there is no problem in returning from the tracking mode to the search mode as was the case in the aforementioned two field-of-view system. Moreover, since the subject system has no moving parts, one eliminates any mechanical alignment problems and the problem that a motor might stick or hang up. Further, by having a hard-mounted set of optics one eliminates problems associated with a high vibration environment or rapid temperature changes. Thus, with the subject fixed optical system, one has increased reliability.

What is therefore provided is a single hard-mounted set of optics which provides a full range from a wide field of view for acquisition to a narrow field of view for high accuracy tracking. The field of view is purposely distorted from its normal narrow field of view to a wide field of view for objects which are significantly off-axis to begin with.

In operation, once a target is acquired during a search mode, the gimbaled optics center the detected target along the optical axis of the system. Gimbaling of the optical head to center the target on the detector crosshairs of the system provides increased magnification and is therefore a factor in improved tracking resolution. As the target is moved onto the optical axis, the system, rather than having a short focal length, now has a relatively long focal length due to the intentional distortion introduced.

Note that in the subject application it is not necessary to recognize the type of missile or other threat. In infrared countermeasure systems, one is working off a radiative heat source which is the exhaust plume of the missile. One is not trying to recognize what type of missile is being used, but rather the existence of a hot source to be pulled out of the background. Thus, even if an off-axis missile is distorted a bit, one is not overly concerned because it is nonetheless a hot spot. One is therefore not trying to recognize anything but merely to center on it.

Once centered by gimbaling the head so that the detected target is within the detector field of view, then motors in the gimbal drive are utilized in the tracking mode to accurately position the plume of the incoming missile on the detector center of what is now an exceedingly narrow field of view due to the purposely distorted optical system.

In one embodiment, the subject system includes a fixed objective lens and an eye or relay lens to image the target onto a focal plane array. In this embodiment, both lenses are positive lenses and have positive focal lengths in that they are both convex/convex-type lenses. It will be noted that the objective lens focuses the image down to a spot and the eye lens or relay lens focuses it onto the focal plane array.

The type of distortion that is employed is so-called barrel distortion which is utilized purposely to obtain a wider field of view out of a fixed optics system. To this end, the objective lens group is configured to gradually increase the distortion at the periphery in order to obtain a wide field of view for off-axis objects. In one embodiment, the normal 88-millimeter focal length of the fixed objective lens corresponding to a telephoto lens when a target is on-axis, gradually diminishes in focal length when the object moves outside the narrow field of view associated with the telephoto lens.

As an example, when an object moves, for instance, plus or minus 5° off the center line of the objective lens, the effective focal length of the system becomes 44 millimeters. There is therefore a two-to-one distortion factor built into the lens system so that, at the edge of the field of view, the optical system looks like it has a 44-millimeter focal length, a short focal length which provides the wide field of view. For objects close to the center line of the lens system, the optical system looks like an 88-millimeter focal length system for good tracking and good resolution. In such a system objects are magnified by 2× when they are near the optical axis of the optical system, whereas they are half that size at the extremities of the field of view.

In one embodiment, a system providing the required optical distortion to increase the field of view includes a classical telephoto lens including a convex/convex lens. This is in turn followed by a negative/negative or concave/concave lens, with the two lenses together forming the telephoto lens used as the objective lens.

In the optical system there is a midgroup of sharply curved lenses. The first of these lenses is a positive/negative lens followed by a positive/negative lens, in turn followed by a negative/positive lens. This group of lenses called a transfer lens group, where most of the field distortion is produced, creates an image from the telephoto group. This image is transferred by the next group of lenses which is a two-lens group called a relay lens assembly. The relay lens assembly transfers the aerial image to the focal plane.

While it will be appreciated that the required distortion may be provided in a number of different ways by a number of lenses having a wide variety of chemical compositions, in one embodiment, the required distortion for the infrared region of the electromagnetic spectrum is provided by a combination of silicon, germanium, chalcogenide glass, zinc sulfide, zinc selenide and calcium fluoride lenses.

For such an optical system, one specifies a small, diffraction-limited, on-axis image size of about 40 microns. The other parameter is that the spot size not increase to more than one and a half times the on-axis spot size or, for instance, 60 microns, for images at the edge of the field.

In short, the subject optical system can be described as lens focused on a detector. The focal length of the lens determines the system field of view for a given detector size, with the longer the focal length, the smaller the field of view.

It is noted that the ratio of focal length to lens diameter affects image quality, with the larger the number, the better the image quality.

The desirable result for the fixed optical system would be to provide it with a wide field of view implying a short focal length so as to be able to acquire targets further from the optical axis of the system. On the other hand, once the target is acquired, precision tracking of point sources requires good central resolution which comes from a long focal length lens.

What is provided, therefore, is a nonlinear system varying from short focal length for a wide field of view for resolution at the field edge, to a long focal length, narrow field of view, high resolution at the field center. The technique for the optical distortion involves designing Foveal optics or non-linear optics that enhance the central resolution of an optical system compared to the resolution at the edge of the field of view. Its purpose is to intentionally create optical distortion in the optical design so as to produce a warped or distorted image, something like that of a fisheye lens, for objects that are at the edge of the field of view.

It will be appreciated that the subject invention provides the capability of going from target acquisition to target track modes in one smooth, continuous operation without field-switching delays and uncertainties. The optics are simpler, less expensive and more robust than those associated with a two field-of-view system. Moreover, in the subject system there are no moving parts and the operation is more reliable.

In summary, a single, hard-mounted set of optics is utilized to replace a two field-of-view system for directed countermeasures. It includes within one continuous but distorted field of view the capability to detect, acquire and characterize targets at the edge of the field while precisely tracking with high target fidelity at the field center. With multiple targets, both tracking of a primary target and acquisition of a secondary target can occur simultaneously, greatly improving countermeasure effectiveness.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
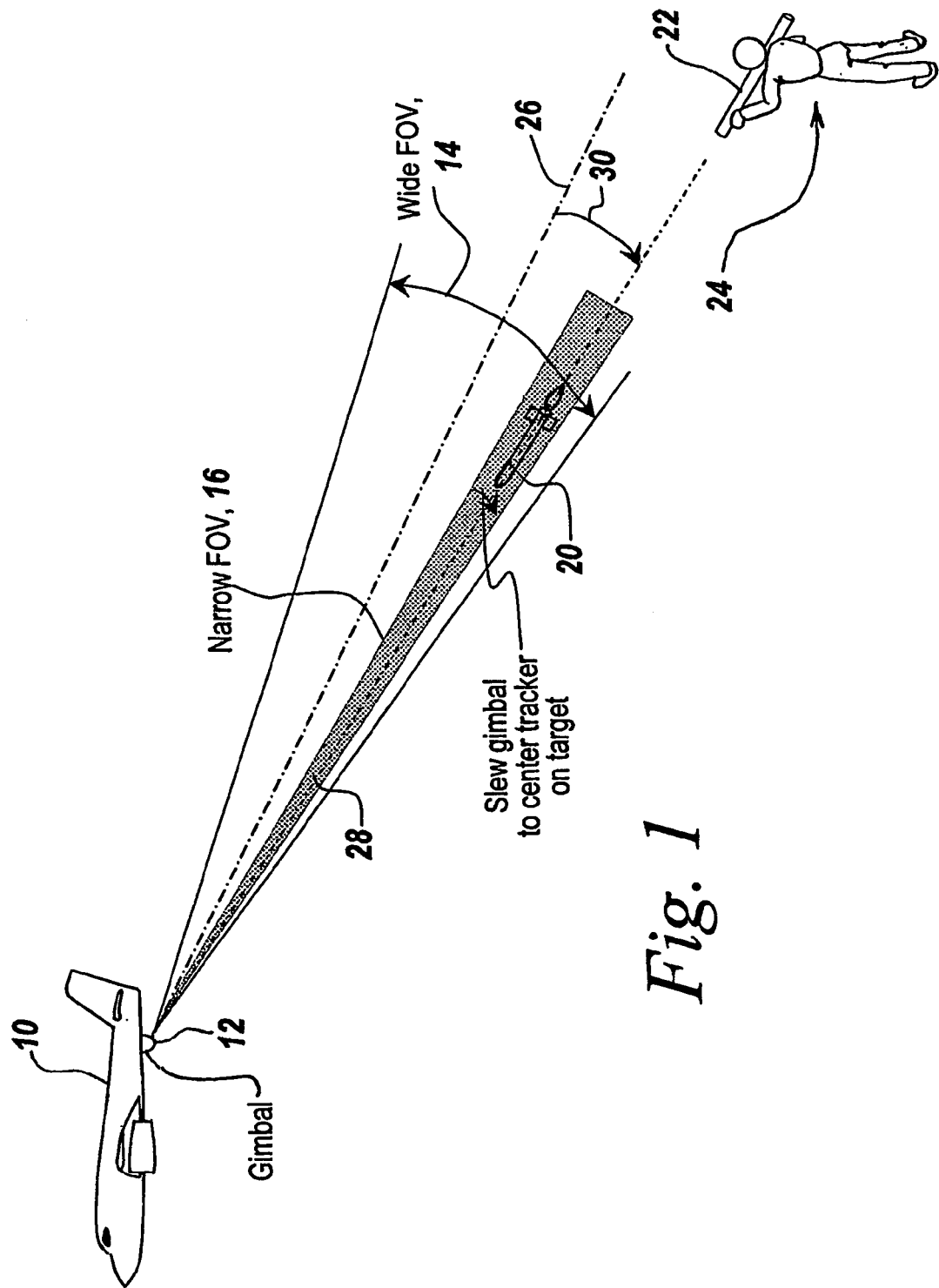
FIG. 1 is a diagrammatic illustration of a search and tracking scenario in which a shoulder-fired missile is launched towards an aircraft, with the missile being detected within the wide field of view of the gimbaled tracker, also showing the narrowed field of view for use in the tracking mode.

Referring now to FIG. 1, a typical scenario is envisaged in which an aircraft 10 has a gimbaled countermeasured system 12 which has internal optics (not shown in this figure) that establish a two field-of-view system. During the search mode, a wide field of view 14 is illustrated which in one embodiment subtends an angle of 30°, whereas in a track mode, the system switches to a narrow field of view 16 subtending 3° so as to be able to track any detected missile.

Here a missile 20 is shown having been launched from a shoulder-fired launcher 22 by an individual 24 towards aircraft 10.

At the time the missile is detected as having been launched, the optical center line of the countermeasure system is that which is shown by a dotted line 26 and it is around this optical center line that the narrow field of view extends.

When launched, missile 20 is directed along a flight path illustrated by dotted line 28 towards aircraft 10. When the missile is detected during a search phase in which a wide field-of-view optical system is switched in, the countermeasure system is gimbaled such that its optical center line 26 is moved as illustrated by arrow 30 so as to coincide with the flight path 28 of missile 20.

Once this has occurred, missile 20 is within the narrow field of view of the optics of the countermeasure system so that its position in space may be accurately tracked.

In one embodiment of this prior art system, tracking involves gimbaling the optical system so as to center missile 20, or at least the plume thereof, on the crosshairs of the system. The tracking is done with an optical feedback loop that requires high magnification and a narrowed field of view.

Once the missile has been successfully tracked, countermeasure system 12 emits jamming radiation along its optical axis which then corresponds to the line of flight of the missile. The result is that the countermeasure radiation enters into the reticule or seeker of the missile and causes the missile to fly off or divert from hitting aircraft 10.

Figure 2:
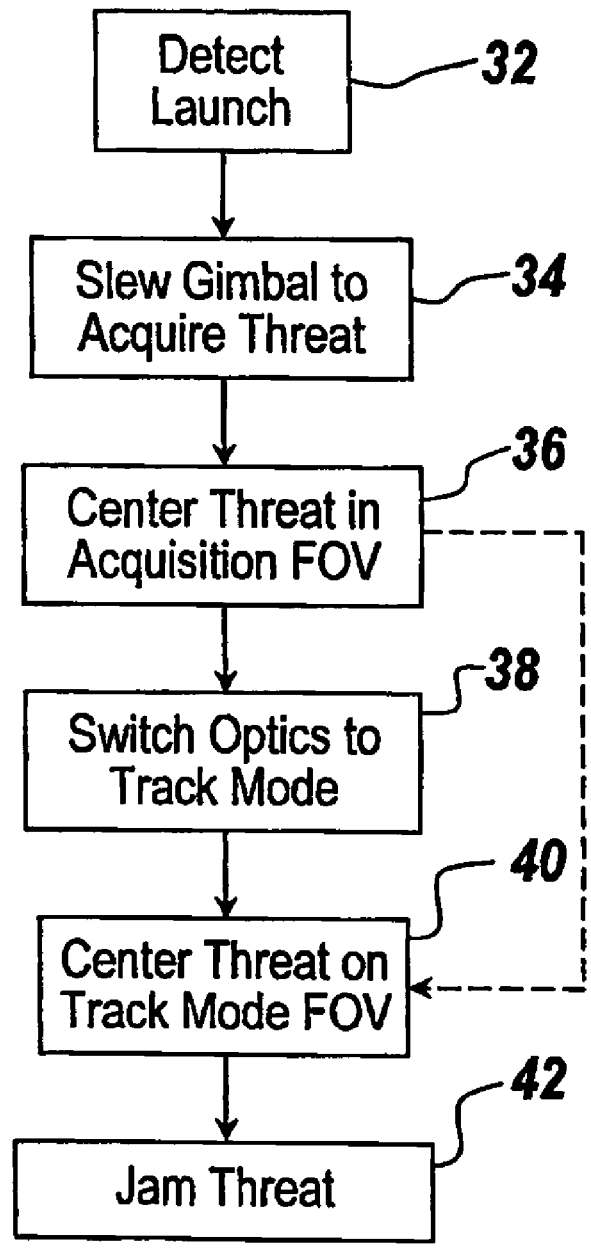
FIG. 2 is a flow chart showing the steps of the counter-measuring of the missile of FIG. 1, including detection of the launch, slewing the gimbal to acquire the missile, centering the missile in the acquisition field of view, switching optics to the track mode, centering the missile on the track mode field of view and emitting jamming radiation, also showing the ability to eliminate the optics-switching step with the subject invention.

As illustrated in FIG. 2, the system of FIG. 1 first detects the launch of the shoulder-fired missile, as illustrated at 32.

The gimbal of the countermeasure system is then slewed to acquire the threat, as illustrated at 34. Once having acquired the threat or recognizing its existence, the gimbal slews the optical system of the countermeasure unit so as to center the detected threat on the acquisition field of view, as illustrated at 36.

Once having centered the threat on the acquisition field of view, the system switches to the track mode which, as will be seen, requires physical rotation or movement of an intermediate lens assembly off the optical center line of the optical system used. This switches the optics to the track mode, as illustrated at 38, with the gimbaling system utilized to center the threat on the track mode field of view as illustrated at 40. Once having centered the threat on the track mode field of view, jamming radiation is admitted along the optical axis of the countermeasure system, as illustrated at 42, which arrives at the missile's seeker, thus confusing the guidance system of the seeker and to cause the missile to miss its intended target.

As mentioned hereinbefore, with approximately three seconds to countermeasure a shoulder-fired missile in the typical scenario, if there is any delay in the switching of the optics from a wide field to a narrow field of view, this switching delay may be of such a magnitude that there will not be sufficient time to go through the steps necessary to effectively countermeasure the missile.

Figure 3:
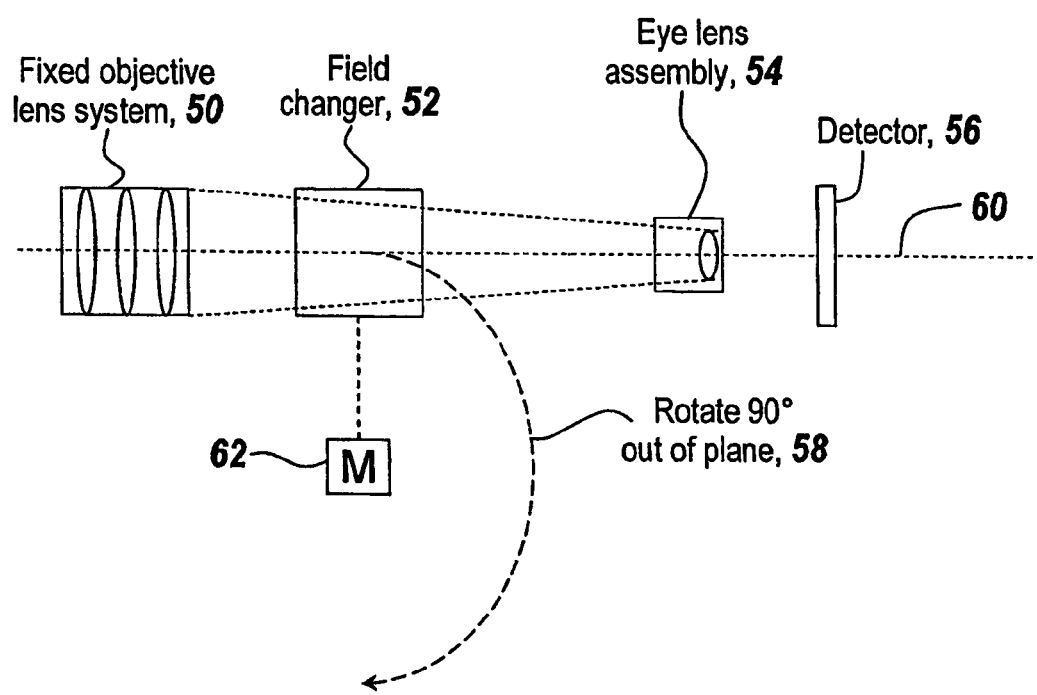
FIG. 3 is a diagrammatic illustration of the rotation of a field changer away from the center line of the fixed objective lens system for field-of-view switching.

Referring to FIG. 3, the optical system within the countermeasure system of FIG. 1, in general includes a fixed objective lens system 50 followed by field changer lens assembly 52, in turn followed by a eye lens assembly or a relay lens assembly 54, that images the result on a detector 56, which in the preferred embodiment is a focal plane array of infrared detectors.

The field changer, which at the short focal length of the overall assembly provides a wide field of view, when going into the tracking mode is rotated as illustrated by arrow 58 away from the optical center line 60 of the optical system.

The result is that, with the field changer in place along optical axis 60, the effective focal length of the system is relatively short. However, when the field changer is rotated away from optical axis 60, the telescopic fixed objective lens system 50 has in one embodiment a focal length which is several times that with the field changer in place. Thus in one embodiment, in the tracking mode, the focal length may be several times that of the search mode and with several times the magnifying power. It will be noted that the field changer is rotated out of the optical system through a solenoid or motor 62.

Figure 4:
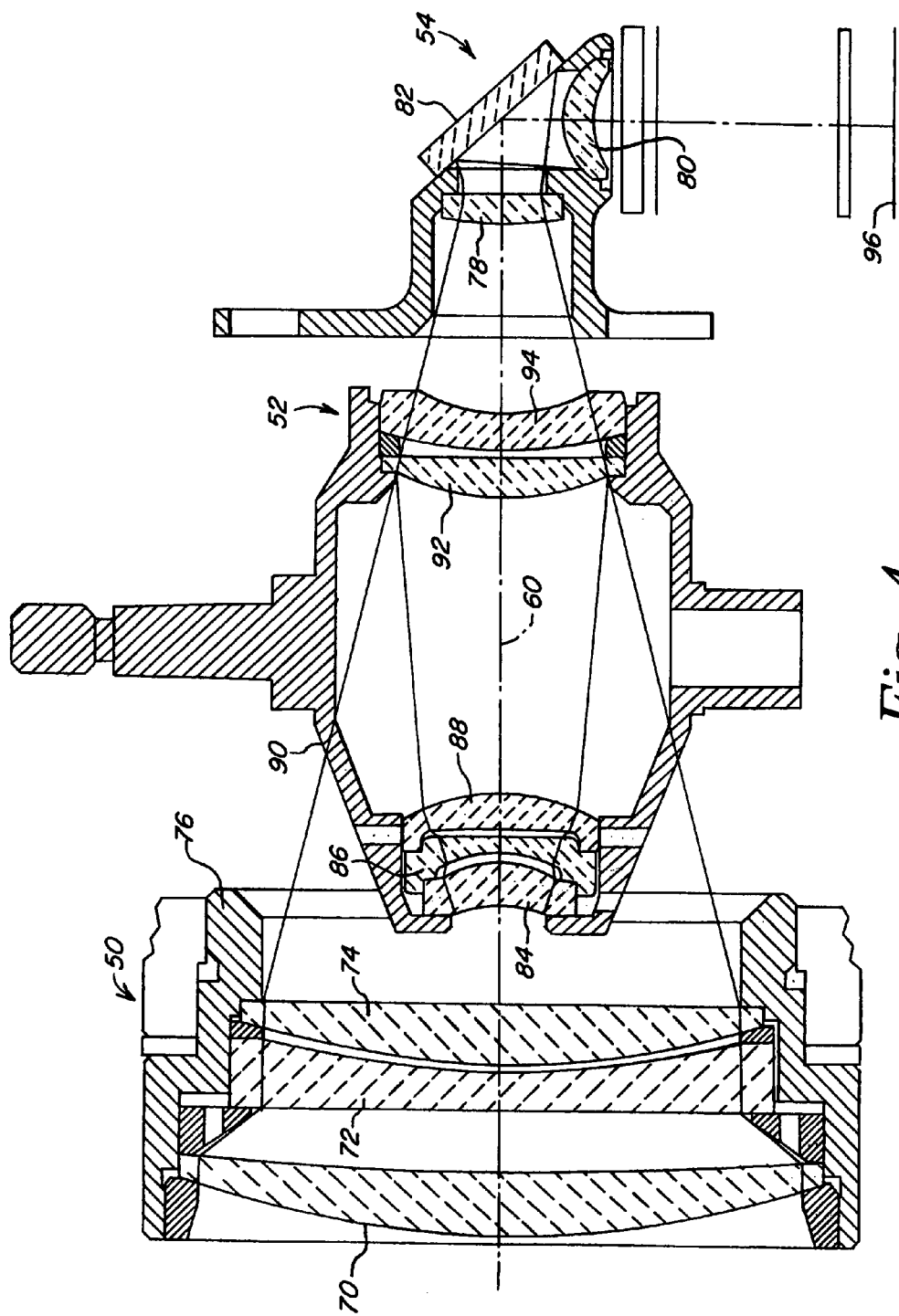
FIG. 4 is a cross-sectional view of the two field-of-view system, illustrating the utilization of a movable lens assembly which is rotated away from the optical center line of the fixed objective lens system to assist tracking by increasing focal length, narrowing the field of view and increasing the magnification.

Referring now to FIG. 4, in one embodiment of the prior art two field-of-view system, the objective lens assembly 50 includes a number of lenses 70, 72 and 74 which constitute fixed lenses mounted to a barrel 76.

Intermediate the objective lens and relay lens assembly 54 comprised of lenses 78 and 80 along with a reflector 82 is a movable assembly 52 which corresponds to a field changer. This lens assembly includes a number of highly curved lenses 84, 86 and 88 in a barrel 90 which also includes lenses 92 and 94 spaced therefrom. It is assembly 52 which is rotated away from center line 60 during the tracking mode such that images are imaged onto a focal plane array 96, both in the tracking mode and in the search or acquisition mode.

Figure 5:
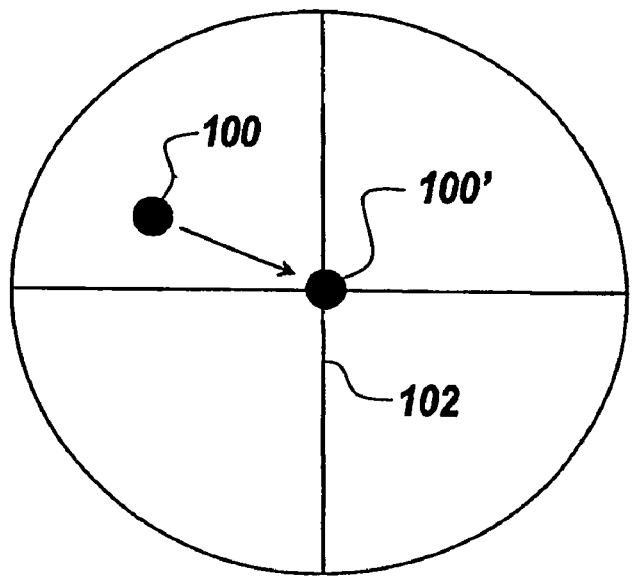
FIG. 5 is a diagrammatic illustration of the field of view of the field-switching optic systems of FIG. 3, illustrating the two field-of-view system in the tracking mode, illustrating the threat object near the crosshairs of the field of view.
Figure 6:
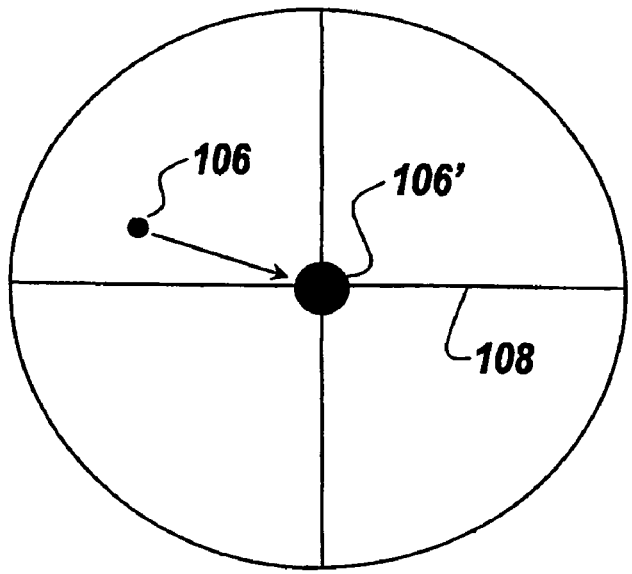
FIG. 6 is a diagrammatic illustration of a Foveal optical system of the subject invention in which the threat object is at first way off-axis and then is centered on the crosshairs of the Foveal optical system.

Referring to FIG. 5, for a field-switching optic system, an object 100 is off-axis and is detected in the search or acquisition mode. This object is shifted onto crosshairs 102 by a gimbaling system, with an image 100' shifted during the search or acquisition phase onto crosshairs 102. Here it will be noted that with the field changer, all that changes is the field of view, with images 100 and 100' being approximately the same size. But the crosshair center for the wide field of view, i.e., the search acquisition center, may be displaced from the crosshair or detector center in the tracking narrow field of view. Therefore, the centering process must be repeated, bringing 100 to 100' on the tracking crosshairs 102. It is these extra steps which are eliminated in FIG. 2 by the subject optical system When using optical distortion techniques to be described and referring now to FIG. 6, while there are no field changers which involve mechanical moving parts, an object 106 which is off-axis is moved to the crosshairs 108 of the subject Foveal optical system. When the object is centered on crosshairs 108, due to the intentional distortions introduced by the subject system, image 106' magnification is twice that of the off-axis image 106.

In short, the nonlinear system of the subject invention distorts off-axis images and makes them smaller at the edges, whereas when the optics are gimbaled to center the incoming missile on the crosshairs, one has better magnification in the track mode and with better magnification one can track with greater precision in less time with increased reliability.

Figure 7:
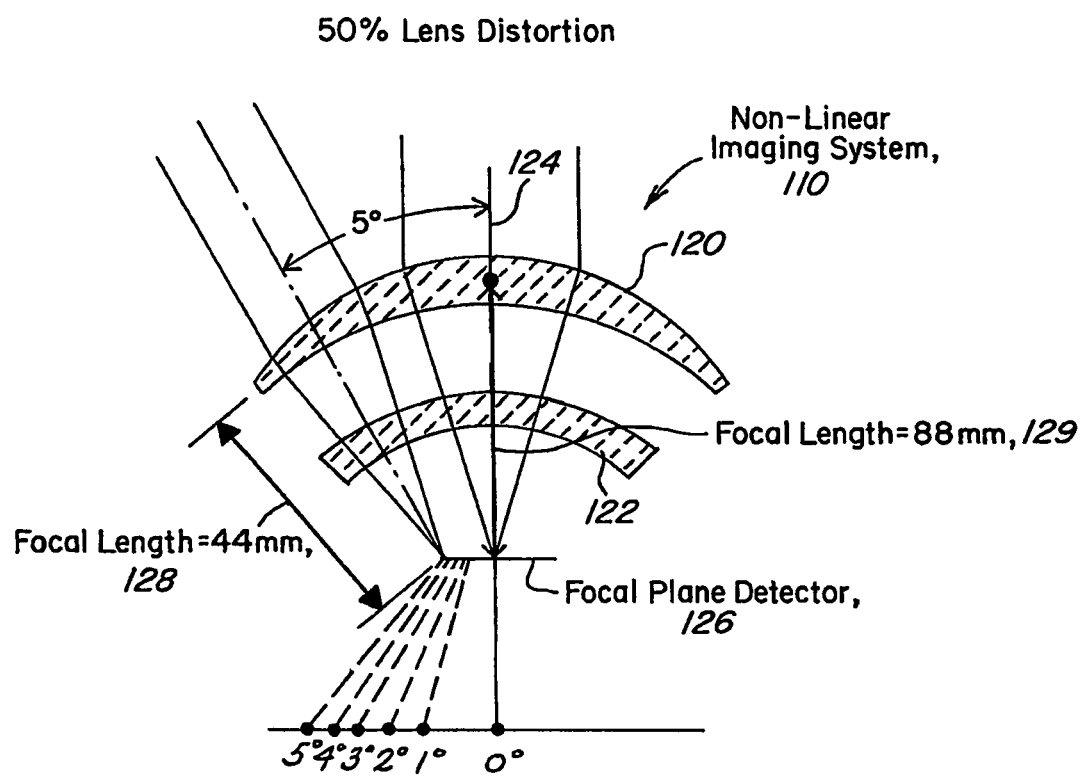
FIG. 7 is a diagrammatic illustration of the subject invention illustrating a nonlinear imaging lens for field distortion, showing the foreshortening of the focal length for off-axis threats.

Referring to FIG. 7, the nonlinear or FOVEAL imaging system of the subject invention is described diagrammatically, with the nonlinear imaging lens system having two lenses, 120 and 122. Lens 120 is in essence wrapped tighter at its edges giving the system a distorted field characteristic. Thus, for instance, at 5° off-axis 124, an image is focused through lenses 120 and 122 onto focal plane detector array 126 with the effective focal length of the system for this off-axis image, here illustrated at 128 to be, in one embodiment, 44 millimeters. The on-axis focal length 129 is 88 millimeters. In this embodiment the lens distortion yields a 2:1 ratio of center-to-edge resolution. In one embodiment, the focal number (F/no.) of such a lens is 3.5 with a focal length of 44 millimeters, an entrance pupil of 12.5 millimeters and an image magnification of one-half that of an on-axis object.

For an on-axis image, the F number is 3.5 with an effective focal length of 88 millimeters and an entrance pupil of −25 millimeters and an image size of X.

As can be seen from the table below this figure, for images 0°, 1°, 2°, 3°, 4°, 5° off axis, the focal points are geographically depicted on the focal plane detector.

What will be seen is that, with the intentionally distorted optics, there is a decreasing magnification from the center to the edge of the lens system.

While what is described from a heuristic point of view in FIG. 7 is a nonlinear or Foveal lens system, the desired distortion can be achieved in a large number of ways.

The term FOVEAL is used as an analogy to the human eye, where the fovea, a portion of the retina, has better sensitivity and resolution than the surrounding retina. By distorting the optical field as described in this disclosure, greater sensitivity and resolution are achieved by the lens rather than the detector—or in the case of the eye, the retina.

Figure 8A:
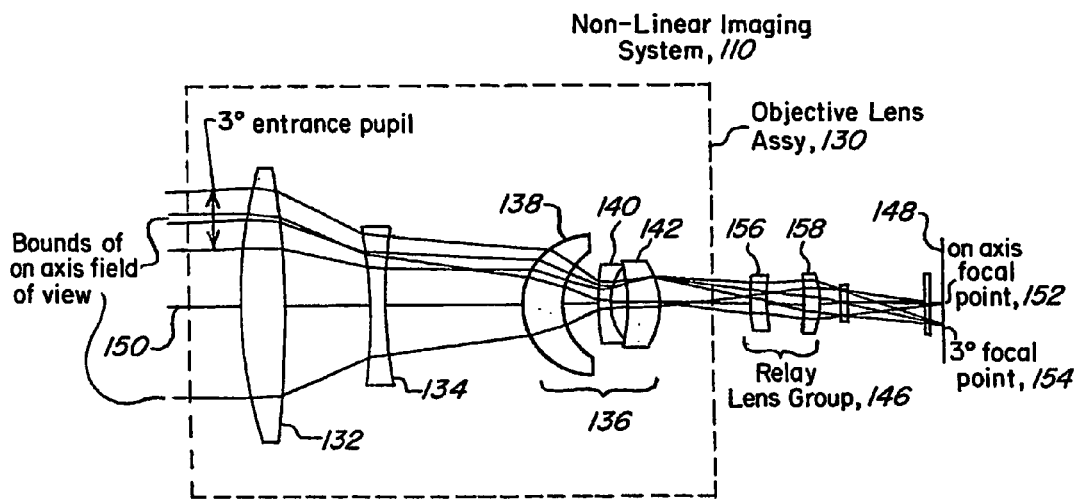
FIG. 8A is a diagrammatic illustration of one embodiment of the subject invention including an objective lens assembly having a telescopic lens portion and a mid-lens portion followed by a relay lens group, showing the on-axis focal point and the 3° off-axis focal point on a focal plane array detector; and, FIG. 8B is a diagrammatic illustration of the system of FIG. 8A, illustrating a 5° off-axis image and resulting 5° focal point.

One way to achieve the desire distortion is illustrated in FIG. 8A in which the nonlinear objective lens assembly 130 is comprised of a number of fixed-mount lenses with an objective lens 132 followed by a collimating lens 134, in turn followed by a mid-lens assembly 136 having a number of highly curved lenses 138, 140 and 142. As will be seen from the following prescription, the objective lens assembly 130 functions as illustrated by lenses 120 and 122 of FIG. 7.

The results of the nonlinear transformations provided by the objective lens assembly are relayed by a relay lens group 146 so as to focus images onto a focal plane array 148 which lies in the focal plane of the optical system.

For an object which is directly centered on axis 150, the image is focused at point 152 as illustrated. For an object which is off-axis by 3°, it is focused on array 148 at focal point 154. It will be appreciated that the relay lens group includes lenses 156 and 158 as illustrated.

Figure 8B:
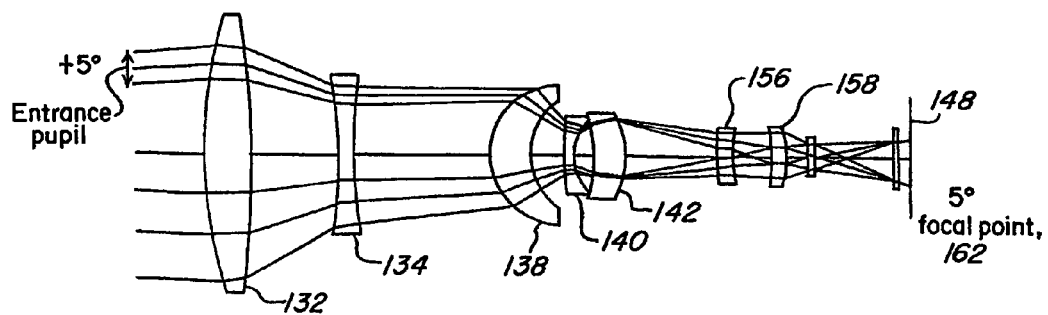

Referring to FIG. 8B in which like elements have like reference characters vis-à-vis FIG. 8A, for an image which is 5° off-axis, the 5° image focal point is illustrated at focal point 156.

From a lens maker's perspective, the following formula or prescription describes a Foveal 4-5 micron objective relay-type 88 millimeter F-3.5 lens assembly from which a lens manufacturer can fabricate the subject nonlinear lens system. Here it can be seen that silicon, germanium, IG4 and Cleartran compositions are used for the indicated lenses.

With such formulation, one achieves optics with barrel distortion in which magnification is greater along the central axis and degrades to one-half magnification at 5° off-axis.

Design #58 (preferred design for use with existing Dewar).

FOVEAL 4-5 MICRON OBJECTIVE, RELAY TYPE, 88 mm, F/3, 5

|  | CUY | THI | RMD | GLA | CCY | THC | GLC |
|---|---|---|---|---|---|---|---|
| >OBJ: | 0.00000000 | INFINITY |  |  | 100 |  | RED |
| 1: | 0.01268202 | 5.500000 | 'IG4' |  | 0 | 100 |  |
| 2: | −0.00819835 | 11.557778 |  |  | 0 | 0 |  |
| ASP: |  |  |  |  |  |  |  |
| K: | 0.000000 | KC: | 100 |  |  |  |  |
| IC: | YES | CUF: | 0.000000 | CCF: | 100 |  |  |
| A: | 0.177725E−05 | B: | −.186173E−09 | C: | 0.000000E−00 | D: 0.000000E+00 |  |
| AC: | 0 | BC: | 0 | CC: | 100 | DC: | 100 |
| 3: | −0.01530392 | 2.000000 |  | 'CLEARTRA' | 19 | 100 |  |
| 4: | 0.01530292 | 17.441008 |  |  | −19 | 0 |  |
| 5: | 0.10326843 | 5.170451 | 'IG4' |  | 0 | 0 |  |
| 6: | 0.10714981 | 4.274324 |  |  | 0 | 0 |  |
| 7: | 0.03299645 | 1.500000 | 'GE*' |  | 0 | 100 |  |
| 8: | 0.20387696 | 2.200503 |  |  | 0 | 0 |  |
| ASP: |  |  |  |  |  |  |  |
| K: | −6.499030 | KC: | 0 |  |  |  |  |
| IC: | YES | CUF: | 0.000000 | CCF: | 100 |  |  |
| A: | 0.896814E−03 | B: | 0.385797E−05 | C: | −.283592E−06 | D: 0.000000E+00 |  |
| AC: | 0 | BC: | 0 | CC: | 0 | DC: | 100 |
| 9: | −0.02419157 | 4.277991 | 'SI' |  | 0 | 0 |  |
| 10: | −0.07858701 | 11.477519 |  |  | 0 | 100 |  |
| 11: | 0.06230395 | 2.000000 | 'GE*' |  | 0 | 100 |  |
| ASP: |  |  |  |  |  |  |  |
| K: | 0.000000 | KC: | 100 |  |  |  |  |
| IC: | YES | CUF: | 0.000000 | CCF: | 100 |  |  |
| A: | −.523428E−03 | B: | 0.257150E−05 | C: | −.387508E−06 | D: 0.000000E+00 |  |
| AC: | 0 | BC: | 0 | CC: | 0 | DC: | 100 |
| 12: | 0.06589881 | 4.966678 |  |  | 0 | 0 |  |
| 13: | −0.01795340 | 2.000000 | 'SI' |  | 0 | 100 |  |
| 14: | −0.07356390 | 2.552748 |  |  | 0 | 0 |  |
| 15: | 0.00000000 | 1.016000 | 'SI' |  | 100 | 100 |  |
| 16: | 0.00000000 | 0.558800 |  |  | 100 | 100 |  |
| STO: | 0.00000000 | 9.372600 |  |  | 100 | 100 |  |
| 18: | 0.00000000 | 0.508000 | 'SI' |  | 100 | 100 |  |
| 19: | 0.00000000 | 1.625600 |  |  | 100 | 100 |  |
| 20: | 0.00000000 | 0.091433 |  |  | 100 | FIM |  |
| IMG: | 0.00000000 | −0.091400 |  |  | 100 | 100 |  |

SPECIFICATION DATA

| FNO | 3.50000 |  |  |  |  |
|---|---|---|---|---|---|
| DIM | MM |  |  |  |  |
| WL | 5000.00 | 4500.00 | 4000.00 |  |  |
| REF | 2 |  |  |  |  |
| WTW | 1 | 1 | 1 |  |  |
| INI | 58 |  |  |  |  |
| XAN | 0.00000 | 0.00000 | 0.00000 | 0.00000 | 0.00000 |
| YAN | 0.00000 | 1.25000 | 2.50000 | 3.75000 | 5.00000 |
| WTF | 1.00000 | 2.00000 | 1.00000 | 1.00000 | 1.00000 |
| VUX | 0.00000 | 0.12663 | 0.30724 | 0.43406 | 0.52308 |
| VLX | 0.00000 | 0.12663 | 0.30724 | 0.43406 | 0.52308 |
| VUY | 0.00000 | 0.30508 | 0.59528 | 0.72877 | 0.81759 |
| VLY | 0.00000 | 0.34718 | 0.63353 | 0.75936 | 0.83945 |

-continued

Design #58 (preferred design for use with existing Dewar).

APERATURE DATA/EDGE DEFINITIONS

CA                APERTURE data not specified for surface Obj thru 21
PRIVATE CATALOG

| PWL | 5000.0 | 4500.00 | 4000.00 |
|---|---|---|---|
| 'IG4' | 2.618320 | 2.619753 | 2.621295 |
| 'GE*' | 4.014934 | 4.018646 | 4.023875 |
| 'SI' | 3.421199 | 3.422511 | 3.424512 |
| 'CLEARTRA' | 2.246598 | 2.249547 | 2.252323 |

REFRACTIVE INDICES

| GLASS CODE | 5000.00 | 4500.00 | 4000.00 |
|---|---|---|---|
| 'SI' | 3.421199 | 3.422611 | 3.424512 |
| 'GE*' | 4.014934 | 4.018646 | 4.023875 |
| 'IG4' | 2.618320 | 2.619753 | 2.621295 |
| 'CLEARTRA' | 2.246598 | 2.249547 | 2.252323 |

SOLVES

| RED | 0.000000 |
|---|---|

FIM
INFINITE CONJUGATES

| RFL | −87.9989 |
|---|---|
| BFL | 0.0914 |
| FFL | −1208.0288 |
| FNO | −3.5000 |
| IMG DIS | 0.0000 |
| OAL | 90.0000 |

PARAXIAL IMAGE

| HT | 7.6989 |
|---|---|
| ANG | 5.0000 |

ENTRANCE PUPIL

| DIA | 25.1426 |
|---|---|
| THI | −518.9585 |

EXIT PUPIL

| DIA | 3.2109 |
|---|---|
| THI | −11.1466 |

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for rapidly acquiring and tracking a threat using a directed countermeasure system without using two separate systems for a narrow field of view and a wider field of view comprising the step of providing a tracker having fixed non-moveable and non-electrically tunable optics having different focal lengths depending on the position in the far field of an object relative to the on-axis centerline of the optics in which variations in the curvatures of one or more lenses in the optics create the distorted field characteristic, the focal length shorter for off-axis objects and longer for on-axis objects, whereby acquisition times are minimized and alignment problems associated with two field-of-view systems are avoided.

2. The method of claim 1, wherein the field of view of the fixed optics is wide corresponding to the shorter focal length and is narrow corresponding to the longer focal length.

3. The method of claim 2, wherein an object is magnified when in the narrow on-axis field of view provided by the longer focal length of the optics.

4. The method of claim 1, and further including imaging objects by the fixed optics onto an IR focal plane array.

5. The method of claim 1, wherein the fixed optics include non-linear optics.

6. The method of claim 1, wherein the fixed optics include Foveal optics.

7. The method of claim 1, wherein the fixed optics intentionally provide barrel or other distortion.

8. The method of claim 1, wherein the fixed optics have the characteristic of a distorted field of view.

9. The method of claim 1, wherein the fixed optics include a lens which has less magnification at its periphery.

10. A method for providing a directed countermeasure system with a wide field of view for threat acquisition and a narrow field of view for threat tracking, comprising the step of:

providing the countermeasure system with a tracker having non-linear non-moveable and non-electrically tunable fixed optics having a distorted field characteristic so as to magnify on-axis objects, the nonlinear optics providing different focal lengths depending on the position in the far field of an object relative to the on-axis centerline of the optics, whereby no moving parts are utilized to simultaneously provide for the wide and narrow fields of view.

11. The method of claim 10, wherein the non-linear fixed optics include Foveal optics.

12. The method of claim 10, wherein the fixed optics have a shorter focal length for off-axis objects and a longer focal length for on-axis objects.

13. Apparatus for rapidly acquiring and tracking a threat using a directed countermeasure system without using a two field-of-view system, comprising
  a tracker having non-moveable and non-electrically tuned fixed optics having different focal lengths depending on the position in the far field of an object relative to the on-axis centerline of the optics in which variations in the curvatures of one or more lenses in the optics create a distorted field characteristic,
  the focal length shorter for off-axis objects and longer for on-axis objects, whereby acquisition times are minimized and alignment problems associated with two field-of-view systems are avoided.

14. The apparatus of claim 13, wherein the field of view of said fixed optics is wide corresponding to the shorter focal length and is narrow corresponding to the longer field of view.

15. The apparatus of claim 13, and further including an IR focal plane array or other detector or sensor onto which objects are imaged by the fixed optics.

16. The apparatus of claim 13, wherein said fixed optics include Foveal optics.

17. A directed countermeasure system having a wide field of view for threat acquisition and a narrow field of view for threat tracking, comprising:
  a tracker for said countermeasure system having non-movable and non-electrically tuned non-linear fixed optics, said fixed optics having a shorter focal length for off-axis objects and a longer focal length for on-axis objects, whereby no moving parts are utilized to provide for the wide and narrow fields of view.

18. The apparatus of claim 17, wherein said non-linear fixed optics include Foveal optics.

* * * * *